United States Patent [19]

Bell et al.

[11] Patent Number: 5,290,090

[45] Date of Patent: Mar. 1, 1994

[54] FOLDING SEAT BACK WITH INTEGRAL CHILD SEAT

[75] Inventors: Timothy D. Bell, Ann Arbor; Earl R. Austin, III, Milan, both of Mich.

[73] Assignee: Hoover Universal, Inc., Plymouth, Mich.

[21] Appl. No.: 930,274

[22] Filed: Aug. 17, 1992

[51] Int. Cl.⁵ ............................................. A47C 15/00
[52] U.S. Cl. ..................................... 297/238; 297/468
[58] Field of Search ............... 297/238, 234, 232, 464, 297/468, 396, 408

[56] References Cited

U.S. PATENT DOCUMENTS

| | | | |
|---|---|---|---|
| 2,966,201 | 12/1960 | Strahler | 297/468 |
| 4,533,175 | 8/1985 | Brennan | 297/232 |
| 4,613,188 | 9/1986 | Tsuge | 297/464 |
| 4,681,367 | 7/1987 | Timmers | 297/232 |
| 4,768,828 | 9/1988 | Kohketsu | 297/464 |
| 5,082,325 | 1/1992 | Sedlack | 297/468 |
| 5,098,161 | 3/1992 | Minami | 297/464 |

Primary Examiner—Paula A. Bradley
Assistant Examiner—James Miner
Attorney, Agent, or Firm—Harness, Dickey & Pierce

[57] ABSTRACT

A seat back for a motor vehicle having a seat back panel that is forwardly rotated from an upright position to a generally horizontal position to enlarge the cargo carrying capacity of the vehicle by joining the trunk space rearward of the seat assembly with the seating area. The seat back panel is further equipped with an integral child seat assembly containing a restraint means for a child seat occupant including at least one belt attached to the vehicle structure rearward of the seat back at the upper end thereof. The belt is releasably attached to the vehicle structure and, to avoid use of the child seat assembly with the belt released from the vehicle structure, a lock-out mechanism is provided to prevent return of the seat back panel to its upright use position without first resecuring the belt to the vehicle structure.

16 Claims, 3 Drawing Sheets

FOLDING SEAT BACK WITH INTEGRAL CHILD SEAT

BACKGROUND AND SUMMARY OF THE INVENTION

The present invention relates to a vehicle seat assembly with an integral child seat therein and in particular to such a seat assembly in which the seat back can be folded down, i.e. rotated forward to provide access to the trunk whereby the trunk space is merged with the space of the vehicle rear seat.

With typical vehicle seat assemblies, the seat belt systems, while closely associated with the seat assemblies are anchored directly to the vehicle structure. As a result, the seat assembly does not carry the restraint loads applied by the seat belts. Instead, these loads are applied directly from the belts to the vehicle structure. However, when a seat assembly is equipped with an integral child seat, the restraint loads from the child seat are typically transferred into the seat back of the seat assembly and from there to the vehicle structure. In the case of bench seats for vans and other utility vehicles, the child seat belt loads are generally transferred through the seat assembly structure to the vehicle floor pan. In passenger car vehicles, the child seat belt loads may be transferred to both the floor pan as well as the horizontal shelf extending behind the seat back at its upper end.

The seat back of the present invention is a folding seat back in which the seat back is pivotally attached at its lower end for rotation from its normal upright use position to a generally horizontal forwardly extending position. In the folded down position, the rear seating area is open to the trunk for increased storage capacity and for storage of articles longer than can be stored in the trunk space alone. When a folding seat back is equipped with an integral child seat and the restraint system for the child seat includes belts attached to the vehicle shelf behind the seat back, the child seat belts will present an obstacle in the increased cargo space if left attached to the shelf when the seat back is folded down.

Accordingly, it is an object of the present invention to provide an integral child seat restraint system in which the belts are detachably coupled to the vehicle enabling the belts to be detached from the shelf when the seat is folded forward.

It is a further object of the present invention to provide a lock out feature to prevent use of the seat assembly, and in particular the integral child seat, unless the belts are attached to the shelf.

The seat back of the present invention includes a rotatable panel that has a normal upright use position in which it forms a portion of the seat back and a forwardly rotated position in which the rear seat area of the vehicle is open to the trunk. The seat back panel also carries an integral child seat having a restraint system that includes belts anchored at their upper ends to the vehicle shelf structure at the top of the seat back and at their lower ends to the vehicle floor pan. To prevent the belts from being an obstacle when the seat back is folded down, the belts are mounted at their upper ends through a mounting plate that is releasably attached to the vehicle structure to enable the mounting plate and the belts to be released and lowered to the folded down seat back panel. When the mounting plate has been released, a lock out mechanism is activated to prevent return of the folded down seat back to its normal upright use position. The seat back panel can only be returned to an inclined position that is unusable for an adult and which also renders the child seat unusable, thereby providing an obvious indicator that the seat back panel is not in its normal position. Only by reattaching the mounting plate to the vehicle shelf structure, thus properly anchoring the child seat belts, can the seat back panel be returned to its normal use position and latched in place.

Further objects, features and advantages of the invention will become apparent from a consideration of the following description and the appended claims when taken in connection with the accompanying drawings.

DETAILED DESCRIPTION OF THE INVENTION

Figure 1:
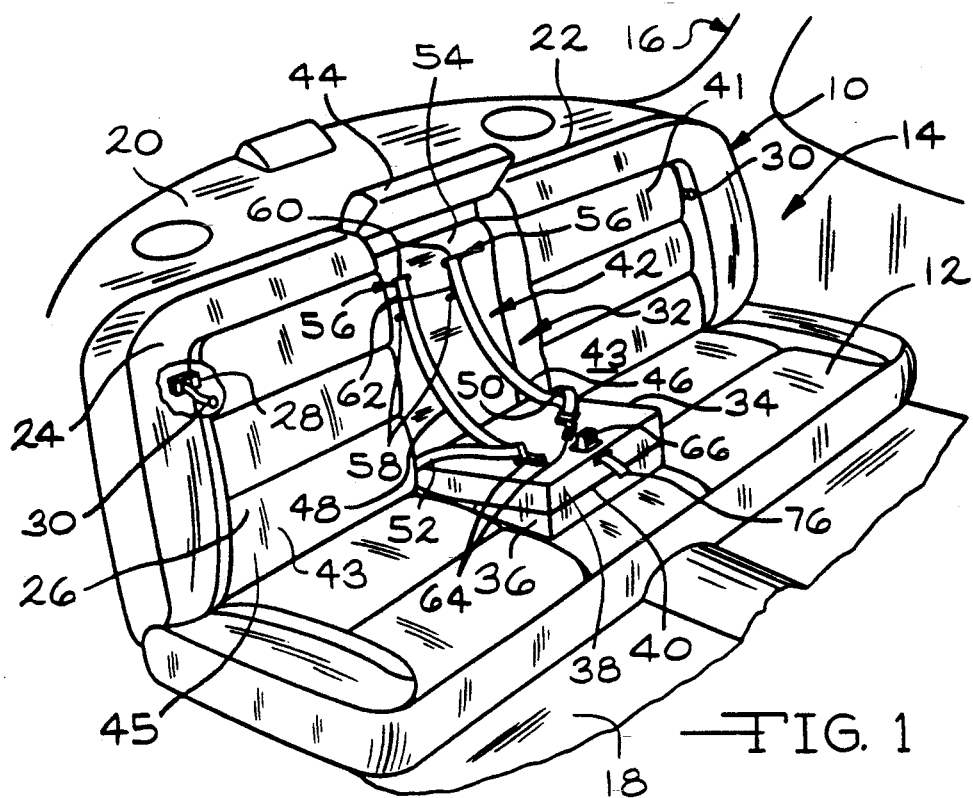
FIG. 1 is a perspective view of the seat back of the present invention with the rotatable seat back panel in its upright use position and the integral child seat deployed.

The seat back of the present invention is shown in FIG. 1 and designated generally at 10. Seat back 10 is shown extending generally upwardly at the rear of a seat cushion 12 and together with the seat cushion forms a bench seat assembly 14 installed within a motor vehicle 16. The vehicle 16 includes a floor pan 18 beneath the seat assembly 14 and a rear shelf 20 extending rearwardly from the upper end 22 of the seat back 10.

The seat back 10 includes two primary components, a collar 24 extending around the periphery of the seat back and a seat back panel 26. The seat back panel 26 and collar 24 are mounted to the vehicle floor pan by the same brackets (not shown). The panel is mounted to be rotated from the generally upright use position shown in FIG. 1 to a forwardly rotated position lying upon the top of the seat cushion 12 shown in phantom line in FIG. 2. The fold down seat panel 26 enables the cargo space of the vehicle trunk 27 to be expanded into the area of the seat assembly 14. At each of the upper corners of the seat back panel, a latch mechanism 28 is provided to couple the seat back panel 26 with the collar 24. The latch mechanism also includes a bracket to attach the collar to the vehicle shelf structure. Fabric pull tabs 30 are provided extending through the upholstery of the seat back for grasping and pulling to release the latch mechanisms 28 to lower the seat back panel. While the seat back has been shown and described as having a collar surrounding the seat back panel, the collar can be eliminated and the panel latched directly to the vehicle structure if desired.

The seat back panel is further equipped with an integral child seat assembly 32. The child seat assembly 32 includes a cushion 34 pivotally mounted at the base of the seat back. A secondary or upper cushion 36 is attached to the cushion 34 at the upper end 38 of the cushion 34 by a fabric hinge 40. In the deployed use position of the child seat assembly, the secondary cushion 36 is folded underneath the child seat cushion 34. Alternatively, the upper cushion can be configured to be removed or the child seat designed with only the cushion 34. When the child seat assembly 32 is in the stowed position, the child seat cushion 34 and secondary cushion 36 are disposed in the cavity 42 in the seat back panel between cushion 41 and 45 and form a portion of the adult seating surface 43 of the seat back. A top panel 44 in the collar 24 can be configured to be flipped up to provide additional height to the cavity 42 above the panel 26 as shown in FIG. 1.

When the child seat is deployed, a pair of belts 46 and 48 are revealed in the cavity 42. At their lower ends 50 and 52, the belts 46 and 48 are connected to the vehicle floor pan 18 by mounting brackets (not shown). The belts extend upwardly from the mounting brackets into the cavity 42 at the two lower corners of the cavity. The belts extend upwardly within the cavity 42 and into the back surface 54 of the seat back panel through slotted openings 56. The slotted openings include two horizontal segments, lower segments 58 and upper segments 60 joined by connecting slots 62. This slotted arrangement allows the positions of the belt's upper ends to be adjustable between two height positions. Each of the belts 46 and 48 carry a clasp 64 which is insertable into a buckle 66 in the child seat cushion 34 to form a five point restraint around a child seat occupant comprising a lap belt and two shoulder belts buckled between the occupant's legs.

Figure 2:
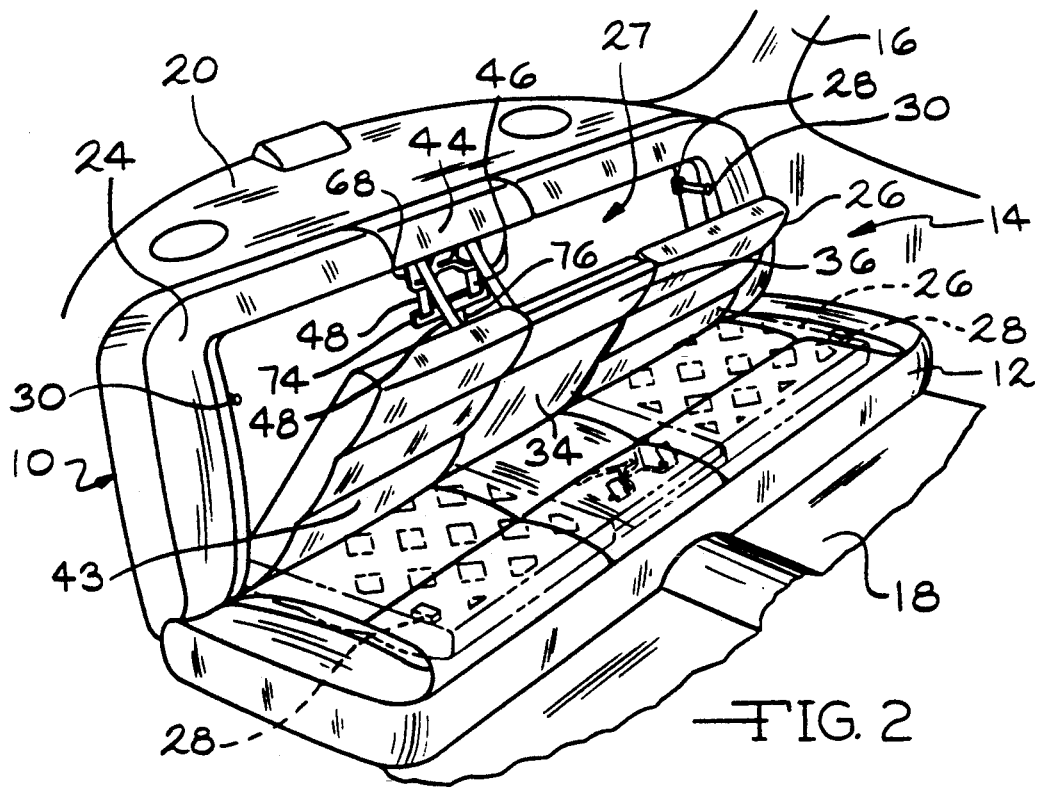
FIG. 2 is a perspective view of the seat back of FIG. 1 with the rotatable seat back panel shown in solid lines in a position partially rotated forward revealing the child seat restraint belts and shown in phantom lines in a full forwardly rotated position.
Figure 3:
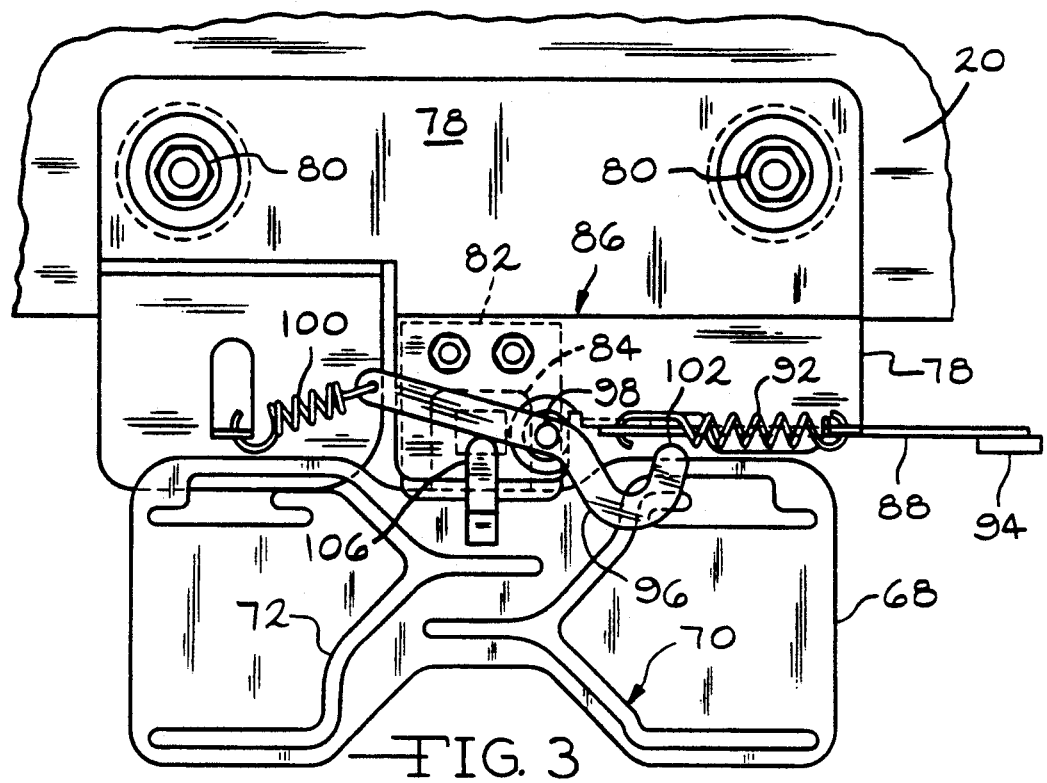
FIG. 3 is a rear view of the child seat belt anchor system and lock-out mechanism with the belts attached to the shelf structure.
Figure 4:
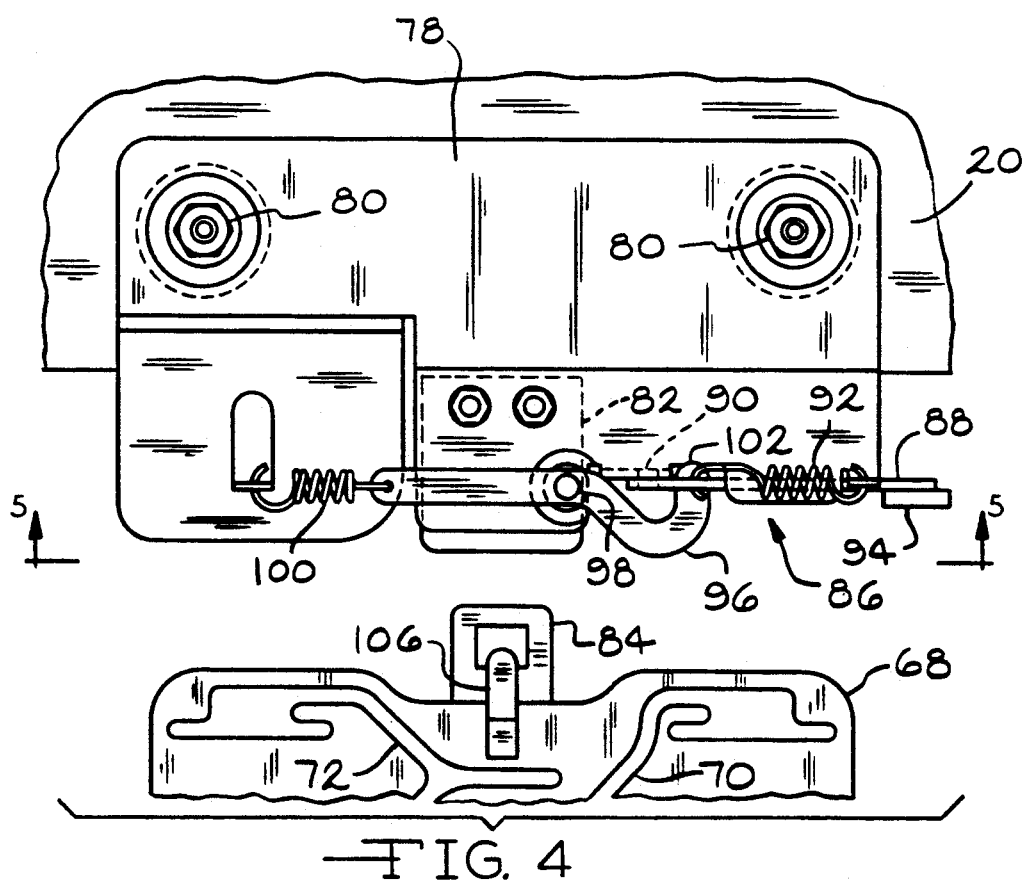
FIG. 4 is a rear view of the child seat belt anchor system with the belts released and the lock-out mechanism activated to prevent return of the seat back panel.

The belts 46 and 48, after extending through the seat back panel 26, pass through a mounting plate 68 that is fastened to the vehicle shelf structure 20, see FIGS. 2 and 3. After passing through the slots 70 and 72 of the mounting plate 68, the belts extend downwardly to an equalizer bar 74. From the bar 74, an adjustment strap 76 extends downward behind the seat back panel 26, into and through the seat cushion 34 and extends from the upper end 38 of the seat cushion. A releasable pawl, not shown, holds the adjustment strap 76 in position in the seat cushion. By pulling the end of strap 76 from the seat cushion, the length of the belts 46 and 48 in the cavity 42 can be shortened. By releasing the pawl and pulling on the belts 46 and 48, the length of the belts can be increased.

The mounting plate 68 is attached to an anchor bracket 78 which is in turn fastened to the vehicle shelf structure 20 by nut and bolt or similar fasteners 80. The mounting plate 68 and anchor bracket 78 provide a load path for the belt loads from the child seat occupant directly to the vehicle shelf structure 20 without being carried by the seat back structure. However, with the upper ends of the belts 46 and 48 anchored to the vehicle shelf, when the seat back panel 26 is folded forward, the belts are left hanging in the opening between the seat area and the vehicle trunk.

The mounting plate 68 is detachable from the anchor bracket 78 for the purpose of removing the upper end attachment of the belts so that the belts can be lowered onto the back of the seat back panel once folded forward. In the embodiment shown, the mounting plate is coupled to the anchor bracket through a buckle 82 with the mounting plate including a clasp 84 for insertion into the buckle 82 in a similar manner as a seat belt clasp and buckle. The mounting plate is detached by simply depressing the release button of the buckle 82 and is reattached by inserting the clasp 84 into the buckle 82. Release of the mounting plate can be accomplished after initial rotation of the seat back panel 26 a few degrees forward from its initial position as shown in FIG. 2. For reattachment, the seat back panel is rotated to nearly the upright position leaving enough room for the operator to reach between the seat back panel and the collar 24 to reinsert the mounting plate clasp into the buckle 82.

Figure 5:
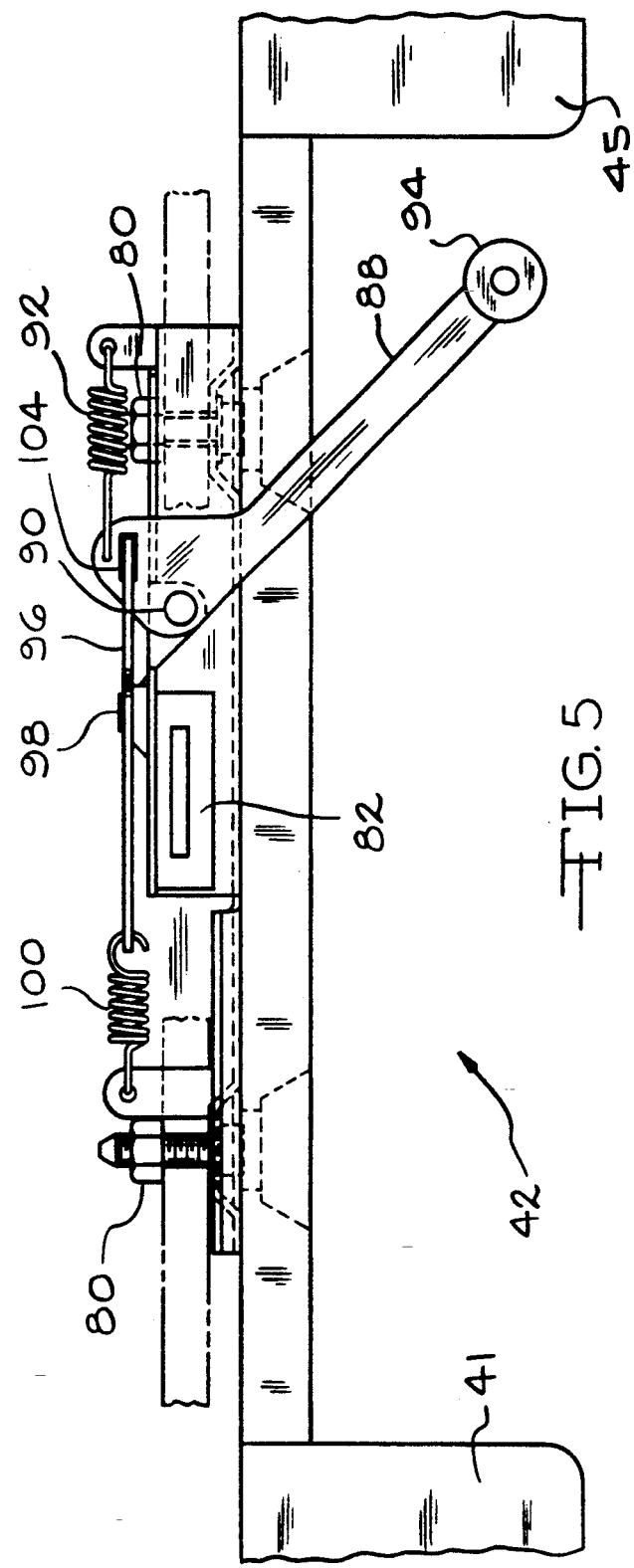
FIG. 5 is a bottom view of the lock-out mechanism as seen from the line 5—5 of FIG. 4.

With a releasable attachment of the seat belts, it is necessary to insure that the vehicle operator has properly secured the seat belts before use of the child seat assembly 32. This is accomplished by a lock-out mechanism 86 carried by the anchor bracket 78. The lock-out mechanism includes a cam lever 88 mounted to the anchor bracket for rotation about pivot 90 in a direction fore and aft of the seat back. The cam lever is biased by tension spring 92 so as to rotate clockwise in the plan view of FIG. 5 to extend the roller 94 at the end of the cam lever forward from the anchor bracket. When the seat back panel is returned to its upright position and the seat belts have been anchored as further described below, the seat back panel will contact the roller 94 prior to full return to its latched upright use position. Upon contact with the roller 94, the seat back will continue in its motion to the upright position and will rotate the cam lever 88 rearward in opposition to the bias spring 92 until the seat back has reached its upright use position and is latched in place by latch mechanisms 28.

When the seat belt mounting plate 68 is released, a locking hook 96, rotatably mounted to the anchor bracket at pivot 98, is rotated by the bias spring 100 so that the end 102 of the hook is inserted into a slot 104 in the cam lever 88. The hook 96 locks the cam lever in place extending forward from the anchor bracket such that when the seat back panel is returned, the cam lever 88 will prevent the seat back panel from being fully returned to its upright use position. The length of the cam lever is determined such that the angle of the seat back panel when contacting the locked cam lever will be an obvious indicator that the seat back panel has not been fully returned. In addition to being a visual indicator that the seat back panel is not in a latched position, the angle of the seat back panel will make seat occupancy by an adult or child uncomfortable.

The only way to release the cam lever is to insert the mounting plate clasp 84 into the buckle 82. The mounting plate includes a tab 106 generally parallel to the clasp 84 which, upon insertion of the clasp into the buckle, contacts the locking hook 96 to the left side of the pivot 98 as viewed in FIG. 3, causing clockwise rotation of the hook. Thus rotation withdraws the hook end 102 from the cam lever slot 104. In the position shown in FIG. 3 in which the tab 106 has pushed up on the locking hook 96, the cam lever 88 is now free to rotate allowing full return of the seat back panel to its latched position. The lock-out mechanism 86 prevents use of the seat assembly 14 and use of the child seat 32 unless the child seat belts 46 and 48 are anchored at their upper ends to the vehicle shelf structure.

It is to be understood that the invention is not limited to the exact construction illustrated and described above, but that various changes and modifications may be made without departing from the spirit and scope of the invention as defined in the following claims.

We claim:

1. A seat back for use in a motor vehicle comprising:
   a back panel having upper and lower ends and a first upwardly extending use position in said vehicle in which the upper end of said seat back panel is positioned adjacent to structure of said vehicle;
   means forming a child seat assembly integrally formed in said back panel;
   restraint means for restraining a child seat occupant, said restraint means including at least one belt extending over the shoulder of a child seat occupant;
   means for anchoring said at least one belt into the structure of said vehicle at the upper end of said back panel;
   means for rotating said back panel forward about an axis adjacent said lower end thereof from said upwardly extending use position to gain access to the space behind said seat back panel;
   means for selectively releasing said anchor means when said back panel is rotated forward to detach said at least one belt from said vehicle structure; and
   lock-out means to prevent said seat back panel from being returned to said upwardly extending use position when said anchor means is selectively released and said at least one belt is detached from said vehicle structure.

2. The seat back of claim 1 wherein said lock out means prevents said seat back panel from being rearwardly rotated to said use position leaving said seat back panel forwardly rotated from said use position providing a visual indication that said seat back is not in said use position and rendering said seat back uncomfortable for occupancy.

3. The seat back of claim 1 wherein said lock-out means includes:
   an engagement lever pivotally mounted to said seat back rearwardly of said seat back panel and having an outer end for engagement with said seat back panel;
   first bias means for rotating said lever to engage said seat back panel with said outer end and, when said seat back panel is forwardly rotated from said upwardly extending use position, said bias means rotating said engagement lever to a lock-out position in which said outer end extends forward from said pivot for contact with said seat back panel before said seat back panel is fully returned to said use position; and
   retaining means for holding said engagement lever in said lock-out position when said at least one belt is detached from said vehicle structure.

4. The seat back of claim 3 wherein said retaining means includes:
   a locking lever pivotally mounted to said seat back and rotatable into a lock position engaging said engagement lever to prevent rotation of said engagement lever from said lock-out position; and
   second bias means for rotating said locking lever to said lock position.

5. The seat back of claim 3 wherein said outer end of said engagement lever includes a rotatable cam for contact with said seat back panel.

6. The seat back of claim 1 wherein said anchor means includes:
   a mounting member carrying said at least one belt at the upper end of said seat back panel; and
   latch means for securing and releasing said mounting member to and from said vehicle structure.

7. The seat back of claim 6 wherein said lock-out means includes:
   an engagement lever pivotally mounted to said seat back rearwardly of said seat back panel and having an outer end for engagement with said seat back panel;
   first bias means for rotating said lever to engage said seat back panel with said outer end and, when said seat back panel is forwardly rotated from said upwardly extending use position, said bias means rotating said engagement lever to a lock-out position in which said outer end extends forward from said pivot for contact with said seat back panel before said seat back panel is fully returned to said use position; and
   retaining means for holding said engagement lever in said lock-out position when said at least one belt is detached from said vehicle structure.

8. The seat back of claim 7 wherein said retaining means includes:
   a locking lever pivotally mounted to said seat back and rotatable into a lock position engaging said engagement lever to prevent rotation of said engagement lever from said lock-out position; and
   second bias means for rotating said locking lever to said lock position when said at least one belt is detached from said vehicle structure.

9. The seat back of claim 8 further comprising means attached to said mounting member for rotating said locking lever from said lock position when said mounting member is secured to said vehicle structure by said latch means whereby said engagement lever is freed to rotate from said lock-out position when said seat back panel is returned to said upwardly extending use position.

10. A seat assembly for use in a motor vehicle comprising:
   a lower seat cushion;
   a seat back extending generally upwardly from a rear of said seat cushion, said seat back including a back panel with upper and lower ends and a first upwardly extending use position in which said panel forms a portion of the seating surface of said seat back;
   means forming an integral child seat assembly in said back panel;
   restraint means for restraining a child seat occupant, said restraint means including at least one belt extending over the shoulder of a child seat occupant;
   means for anchoring said at least one belt into the structure of said vehicle at the upper end of said back panel;
   means for rotating said back panel forward about an axis adjacent said lower end thereof from said upwardly extending use position to gain access to the space behind said seat back panel;
   means for selectively releasing said anchor means after said back panel is rotated forward to detach said at least one belt from said vehicle structure; and
   lock-out means to prevent said back panel from being returned to said upwardly extending use position when said at least one belt is detached from said vehicle structure.

11. The seat back of claim 10 wherein said anchor means includes:
   a mounting member carrying said at least one belt at the upper end of said seat assembly panel; and
   latch means for securing and releasing said mounting member to and from said vehicle structure.

12. The seat back of claim 11 wherein said lock-out means includes:
   an engagement lever pivotally mounted to said seat assembly rearwardly of said seat assembly panel and having an outer end for engagement with said seat assembly panel;
   first bias means for rotating said lever to engage said seat assembly panel with said outer end and, when said seat assembly panel is forwardly rotated from said upwardly extending use position said bias means rotating said engagement lever to a lock-out position to which said outer extends forward from said pivot;
   a locking lever pivotally mounted to said seat assembly and rotatable into a lock position engaging said engagement lever to prevent rotation of said engagement lever from said lock-out position; and
   second bias means for rotating said locking lever to said lock position when said at least one belt is detached from said vehicle structure.

13. The seat back of claim 12 further comprising means attached to said mounting member for rotating said locking lever from said lock position in opposition to said second bias means when said mounting member is secured to said vehicle structure by said latch means whereby said engagement lever is freed to rotate from said lock-out position when said seat back panel is returned to said upwardly extending use position.

14. The seat assembly of claim 12 wherein said mounting member includes an extending tab for contact with said locking lever when said mounting member is secured to said vehicle structure, said extending tab rotating said locking lever from said lock position in opposition to said second bias means to disengage said locking lever from said engagement lever to enable said engagement lever to rotate from said lock-out position.

15. The seat assembly of claim 11 wherein said at least one belt passes through an opening in said mounting member and extends downwardly behind said back panel.

16. The seat assembly of claim 11 wherein said latch means includes a buckle attached to said vehicle structure at the upper end of said back panel and said mounting member includes a clasp insertable into said buckle to secure said mounting member to said vehicle structure.

* * * * *